No. 744,016. PATENTED NOV. 10, 1903.
D. McLAUGHLIN.
LOAD RETAINING OR RELEASING MEANS FOR VEHICLES.
APPLICATION FILED DEC. 2, 1902.
NO MODEL.
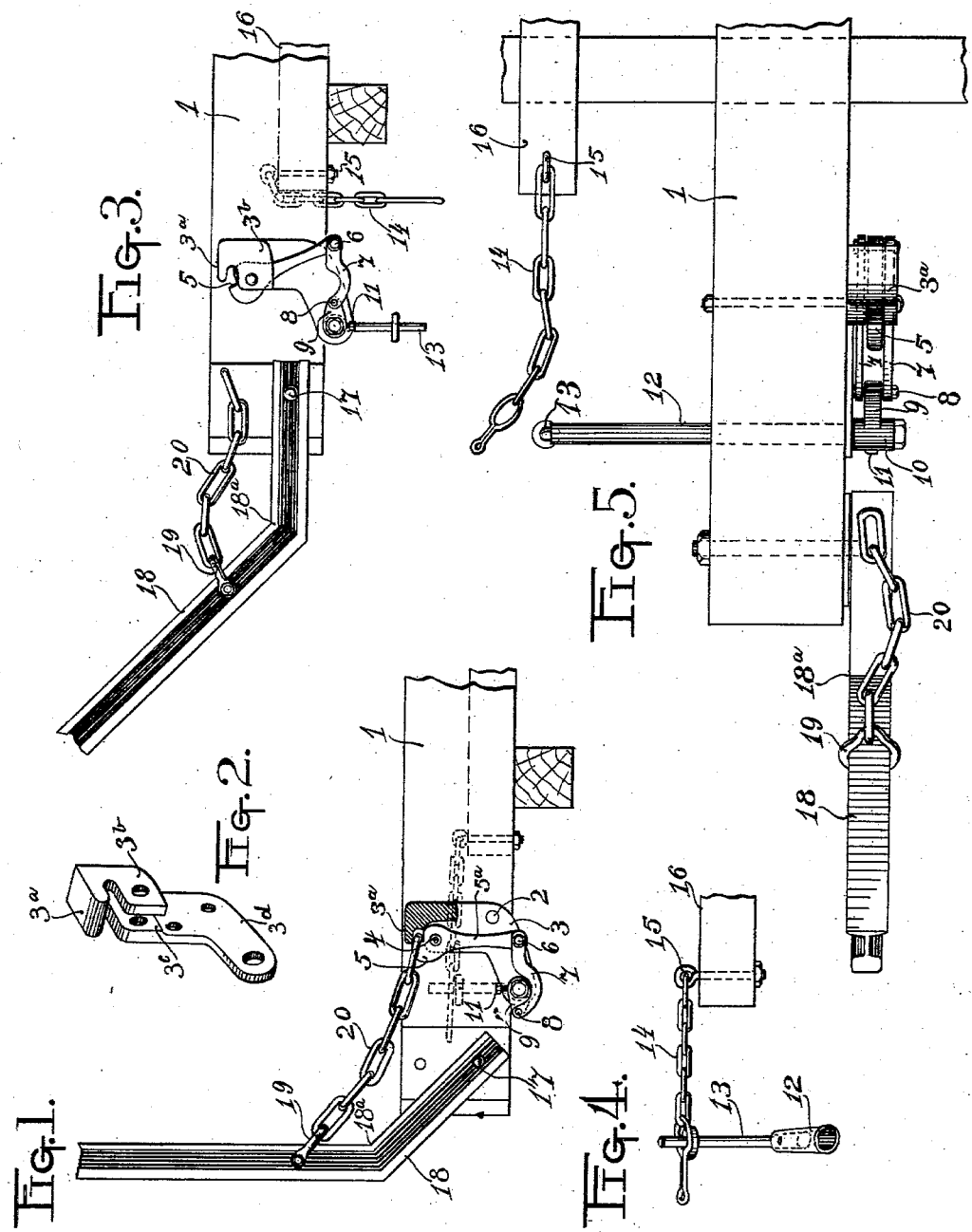
Witnesses
Wellington M Blewett
Marguerite L. O'Heron
Inventor
David McLaughlin
By James T. Watson
His Attorney No. 744,016.

Patented November 10, 1903.

UNITED STATES PATENT OFFICE.

DAVID McLAUGHLIN, OF DULUTH, MINNESOTA.

LOAD RETAINING OR RELEASING MEANS FOR VEHICLES.

SPECIFICATION forming part of Letters Patent No. 744,016, dated November 10, 1903.

Application filed December 2, 1902. Serial No. 133,589. (No model.)

*To all whom it may concern:*

Be it known that I, DAVID McLAUGHLIN, a citizen of the United States, residing at Duluth, in the county of St. Louis and State of Minnesota, have invented certain new and useful Improvements in Load Retaining and Releasing Means for Vehicles; and I do hereby declare the following to be a full, clear, and exact description of the invention, such as will enable others skilled in the art to which it appertains to make and use the same.

My invention relates to load retaining and releasing means for vehicles, and particularly for logging-cars, and has for its object the provision of load-retaining means which may be operated with certainty and ease to release the load by an operator occupying a position of safety.

It consists, in combination with a logging-car or other vehicle or load-supporting structure, of a bracket secured to the side of one of the bolsters or sills thereof, a hook pivoted at its head to said bracket and provided with a lever portion adapted to move radially in a plane parallel with the side of said bracket, means for controlling the movement of said lever, and means adapted to be controlled by said hook for retaining the load upon said vehicle.

It also consists of certain other constructions, combinations, and arrangements of parts, as will be hereinafter described and claimed.

In the drawings, Figure 1 is a side elevation, partly in section, of my said invention in load-retaining position. Fig. 2 is a perspective view in detail, on an enlarged scale, of the bracket forming part of my said invention. Fig. 3 is a side elevation of my said invention in load-releasing position, the stake being in the act of falling. Fig. 4 is a perspective view in detail, on an enlarged scale, in operative position, partly in section, of the operating rod and handle and rod-securing means forming part of my said invention. Fig. 5 is a top plan view, on an enlarged scale, in load-releasing position, of my said invention, the stake being in the act of falling.

In the drawings, 1 is the bolster or bunk of a logging-car upon the side of which is secured in any suitable manner, as by one or more bolts 2, a bracket 3, preferably formed with an overhanging portion $3^a$ and a depending portion $3^b$ and a shoulder $3^c$ and a downwardly-inclined toe portion $3^d$. To said bracket, between said shoulder and depending portion $3^b$, is pivoted in any suitable manner, as by a bolt 4, a lever having a hook portion 5 and a shank portion $5^a$. To the lower end of said lever is pivoted in any suitable manner, as by a bolt 6, one or more links 7, which are pivoted at their opposite ends in any suitable manner, as by a bolt 8, to an eccentric lug 9, formed upon a collar 10, which collar is rigidly secured in any suitable manner, as by a set-screw 11, to a shaft 12, preferably consisting of a pipe, which shaft is journaled in the said toe portion of said bracket and extends toward the end of said car and is provided at or near such end with an operating-handle 13, adapted in operative position to be engaged by the terminal link of the free end of a chain 14, which chain is preferably secured at its opposite end to an eyebolt 15, secured in the brake-beam 16 of said car. Said rod may, however, within the scope of my invention be secured in operative position by any suitable and convenient means. Upon the side of said bolster, near the end thereof, or, if desired, upon a bracket secured thereto, is pivoted in any suitable manner, as by bolt 17, a stake 18, preferably consisting of a portion of a railway-rail and preferably bent, as at $18^a$, to enable said stake to be radially lowered upon the deck of said car. Pivotally secured to said stake, preferably above the bend therein, is a link or clevis 19, to which is secured one end of a chain 20, the opposite end of which chain is adapted in operative position to be engaged by the said hook portion 5 of said lever in coöperation with the forward edge of the overhanging portion $3^a$ of said bracket, by which means said stake is held in load-retaining position. In operation said stake is radially raised, so that the upper end thereof is approximately vertical. The free end of said chain 20 is then caught upon said hook 5, and said lever is operated so as to cause said end of said chain to be clasped by said hook and the overhanging portion of said bracket. The operating-rod is then locked in position by said chain 14 or otherwise, and the logs are then loaded upon said car. The slack, if any, in said chain 20 is taken up by laying the side log of the first tier upon or against said chain. When it is desired to debark the load, the operator goes to the end of the car out of the path which the logs will take in falling and disengages said chain 14 from the operating-handle. The operating-rod is then given a partial revolution by means of said handle, assisted by the strain of the load upon said lever. The operation of said rod through the medium of said collar, eccentric lug, and links secured thereto swings the shank portion of said lever radially backward and upward a limited distance, whereby the hook portion of said lever is swung forward and downward, terminating the coöperative engagement of said hook with the overhanging portion of said bracket and releasing said chain 20 from engagement therewith. The load bearing against said stake presses it radially outward and downward, whereupon the load is released. When said car is empty and it is desired to pass the same through or under a log-loading machine, bridging the track, said stake may be radially lowered upon the deck of the car. Said operating-rod may, if desired, be extended to operate any desired number of similar load retaining and releasing means upon the same side of the vehicle, and similar means may be provided upon the opposite side of the car. In place of said chain 20 any suitable flexible means may be used, and, if desired, said means may within the scope of my invention be carried over the load and secured to a similar or other suitable anchorage upon the opposite side of the car without using stakes.

While I have described certain embodiments of my said invention, it is obvious that the same may be modified or altered in minor details within the scope thereof, and I do not, therefore, desire to be limited to the exact details shown.

Having now described my invention, what I claim, and desire to secure by Letters Patent, is—

1. In load retaining and releasing means for vehicles, the combination with a vehicle, of a bracket secured thereto, a hook-lever pivotally secured to said bracket, means for controlling the movement of said lever, a load-retaining stake mounted upon the side of said vehicle and adapted to swing radially outward and downward therefrom, and flexible means adapted, in operative position, to engage said hook-lever and to secure said stake in raised position, substantially as described.

2. In means for the purposes described, the combination with a load-supporting structure of a bracket secured thereto, a lever pivoted to said bracket and comprising a hook and a shank portion, an operating-rod, an eccentric lug formed on or secured to said rod, a link pivotally connected at one end to the lower end of said lever and pivotally connected at the opposite end to said eccentric lug, means for operating said rod, and means adapted to to be controlled by said hook, for retaining a load upon said vehicle, substantially as described.

3. In means for the purposes described, the combination with a bolster or sill of a load-supporting structure, of a bracket secured to the side thereof, a lever pivotally secured intermediate of its ends to said bracket and comprising a hook and a shank portion, means connected with said shank portion for operating said lever, and flexible means adapted to be controlled by said hook for retaining a load upon said structure.

4. In means for the purposes described, the combination with the bolster or sill of a load-supporting structure, of a bracket comprising a body portion an overhanging portion and a downwardly-inclined toe portion, a lever journaled near its upper end to said bracket, between said body portion and said depending portion thereof, and adapted to swing radially in a plane parallel with the side of said bracket, a stake pivoted near its lower end to said bolster or sill, flexible means secured to said stake and adapted at one end to be engaged and secured by said hook in coöperation with the overhanging portion of said bracket, means for operating said lever and means for locking said operating means in load-retaining position substantially as described.

In testimony whereof I have hereunto signed my name in presence of two witnesses.

DAVID McLAUGHLIN.

Witnesses:
WELLINGTON M. BLEWETT,
MARGUERITE L. O'HERON.